March 14, 1939.     S. A. SCHERBATSKOY     2,150,405
GRAVITY METER
Filed Jan. 29, 1938

INVENTOR
Serge A. Scherbatskoy.

Patented Mar. 14, 1939

2,150,405

UNITED STATES PATENT OFFICE 2,150,405

GRAVITY METER

Serge Alexander Scherbatskoy, Tulsa, Okla., assignor to Engineering Laboratories, Inc., Tulsa, Okla., a corporation of Oklahoma Application January 29, 1938, Serial No. 187,760

5 Claims. (Cl. 265—1.4)

This invention relates primarily to systems employed for determining small differences in the force of gravity and its variations from point to point over the earth's surface. It has particular reference to the determination of the variations in the gravity constant, usually designated by the symbol $g$, and its relation to geophysical exploration work.

It has been recognized for some time that the force of gravity or the value of $g$, varies somewhat from place to place, even over a relatively small area, in accordance with the differences in the structure of the earth's crust. For example, a formation of relatively dense structure, either protruding from the earth or entirely hidden below the earth's surface, will bring about an increase in the value of $g$, while intrusion of a relatively light body at a particular point below the earth's surface will tend to decrease the value of $g$ at that point. This fact has been relied upon as an aid to the location of hidden deposits of various kinds and methods based upon it are particularly well suited to regions where definite variations of the value of $g$ may be taken to indicate with fair certainty a particular formation. For example, in the Gulf Coast region of the United States, it has been discovered that certain variation in the value of $g$ from the normal value to be expected at the particular locality may constitute a reliable indication of the presence of a salt dome. This in turn is indicative of a structure suitable for the accumulation of oil.

Various methods have been suggested in the past for determining the gravity variations over large areas. One form of device commonly employed for this purpose is known as a gravimeter. The gravimeter consists essentially of a mass supported by means of a spring from a fixed support. The mass when subjected to the effects of varying gravity performs minute motions which are usually measured by optical means. (See "Gravimeter Design and Operation" by A. B. Bryan, published in Geophysics Vol. II, No. 4, October 1937, pp. 301–308.)

It has been the experience of the prior art that when a high degree of precision is required the elongation of a spring cannot be used as an exact measure of gravity variation. Because of various elastical imperfections of a spring such as hysteresis, fatigue effects, permanent structural deformation, etc., any process which involves elongation of a spring is non-reversible and, therefore, is not adapted for attaining a great precision.

The non-reversibility of the spring is considered to be the essential and the most important limitation preventing the attainment of considerably greater precision. Assume that the gravimeter had been initially positioned at a certain location A, at which the pull of the earth upon the mass causes a corresponding initial elongation of the spring, and that subsequently the gravimeter was displaced to another location B, at which the gravity constant is greater. Consequently, at the station B the elongation of the spring has increased and according to the method practiced in the prior art, an increased elongation has been interpreted as an indication of the increased gravity constant. Assume now that the gravimeter has been returned from the station B to its prior position at the station A, and consequently, the suspended mass was again subjected to the same force of attraction as initially. Experience shows that the elongation of the spring does not return to its initial value, but assumes a new value which is slightly larger than the initial value. It is apparent now that an erroneous conclusion might be drawn which would consist in a statement that the force of gravity at the station A prior to its position at B is smaller than the force of gravity at the station A after the gravimeter was returned to its initial position. It is, therefore, apparent that the elongation of the spring cannot be considered as a precise indication of the gravity force.

Accordingly, it is an object of my invention to provide a gravimeter in which the inexactitude resulting from the elastic imperfections of the spring is eliminated.

It is another object of my invention to provide a gravimeter which will be simple and reliable in operation.

Further objects of my invention will become more apparent by consideration of a detailed description in conjunction with the accompanying drawing, which forms a part of the specification and in which.

The invention consists essentially of a mass, a fixed support, a spring supporting the mass from the support, a structure constraining the mass to occupy a substantially constant position when subjected to a varying gravitational force, an element responsive to the pressure exerted by the mass upon the said structure under the effect of a varying gravitational force, for indicating the pressure, an auxiliary spring reducing this pressure to zero and means for indicating the tension of this auxiliary spring.

Figure 1:
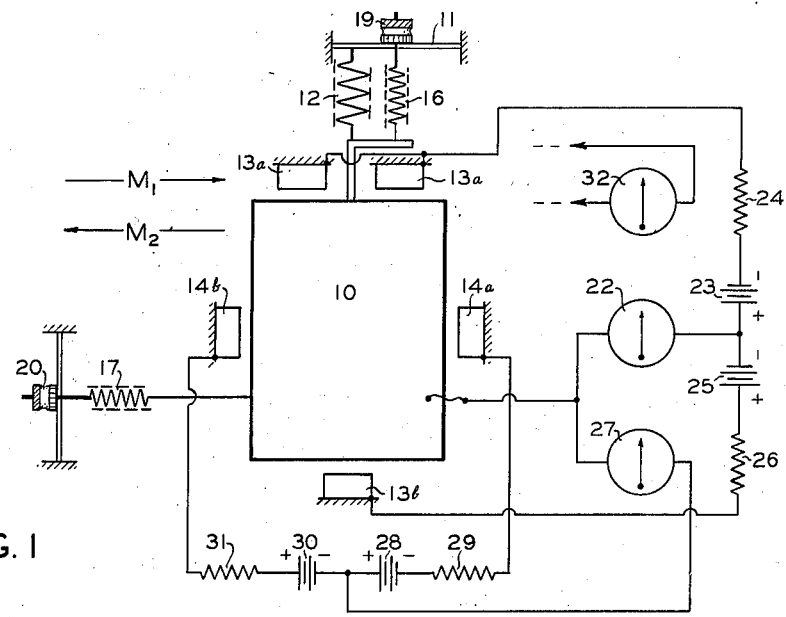
Fig. 1 shows schematically a gravimeter embodying my invention, and in which the motions of the mass are limited by an appropriate structure.
Figure 2:
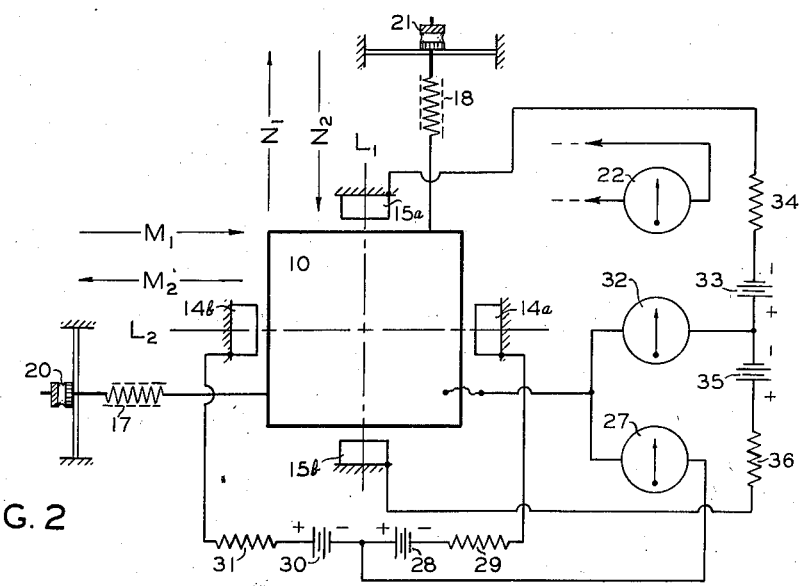
Fig. 2 shows the gravimeter of the type of Fig. 1 and contains some circuit elements which are not shown in Fig. 1.

Referring now to Fig. 1 and to Fig. 2, numeral 10 indicates a mass which is suspended from a fixed support 11 by means of a spring 12. The mass is maintained at a substantially invariable position by means of a structure including three pairs of metallic stops which are designated as: 13a, 13b, 14a, 14b and 15a, 15b respectively. The stops 13a, 13b limit the motions of the mass in the upward and in the downward direction, the stops 14a, 14b limit the motions in the horizontal plane along the directions indicated by arrows $M_1$, $M_2$ respectively, and the clamps 15a, 15b limit the horizontal motions along the direction perpendicular to $M_1$, $M_2$ and indicated by arrows $N_1$, $N_2$ respectively. When the mass is displaced by an extremely small amount in the upward direction an electrical connection is provided between the mass and the upper stop 13a, and when the displacement is in the downward direction, an electrical connection is provided between the mass and the lower stop 13b. In a similar manner when the mass is displaced by an extremely small amount in the direction of the arrow $M_1$ or $M_2$ an electrical connection is provided between the mass and the stop 14a, or 14b and for the displacement in the direction of the arrow $N_1$ or $N_2$ electrical connections are provided with the stop 15a or 15b. Three additional springs 16, 17, 18 adjustable by means of screws 19, 20, 21 respectively, are provided in order to maintain the mass equidistant from the stops 13a, 13b, 14a, 14b and 15a, 15b respectively.

The mass 10 is connected to one of the terminals of a galvanometer 22, the other terminal of the galvanometer being connected through a battery 23, resistor 24 to the stop 13a and through a battery 25, resistor 26 to the stop 13b. The mass 10 is also connected to one of the terminals of a galvanometer 27, the other terminal of the galvanometer being connected through a battery 28, resistor 29 to the stop 14a and through a battery 30, resistor 31 to the stop 14b. The mass 10 is also connected to one of the terminals of a galvanometer 32, the other terminal of the galvanometer being connected through a battery 33, resistor 34 to the stop 15a, and through a battery 35, resistor 36 to the stop 15b.

Assume now that at its initial position the springs 16, 17, 18 have been so adjusted that the mass 10 occupies a neutral position and there is no direct electrical contact between the mass and either of the stops. Under these conditions the output terminals of each of the batteries 23, 25, 28, 30, 33, 35 will be open circuited and there will be no current passing through either of the galvanometers 22, 27, 32.

Assume now that the apparatus has been moved to another location at which the magnitude of the gravity constant has increased. Then the conditions of equilibrium as those which existed before do not prevail any longer. The equilibrium becomes disturbed and the excess of gravity tends to lower the mass 10. Consequently, an electrical contact becomes established between the mass 10 and the lower stop 13b. Under these circumstances the output terminals of the battery 25 become electrically connected and a current is delivered from the positive terminal of the battery through the resistor 26, the stop 13b to the mass 10 and through the galvanometer 22 to the negative terminal of the battery 25. This current causes a deflection of the galvanometer 22.

If, however, we assume, that the apparatus has moved to a location at which the magnitude of the gravity constant has decreased the mass 10 becomes displaced in the upward direction, so as to establish an electrical contact with the upper stop 13a. Then the output terminals of the battery 23 become electrically connected and a current is delivered from the positive terminal of the battery through the galvanometer 22, the mass 10, the stop 13a, the resistor 24 to the negative terminal of the battery 23. This current causes a deflection of the galvanometer 22 in a direction which is opposite to the one occurring under the conditions described in the preceding paragraph.

It is thus apparent that the deflection of the galvanometer 22 indicates whether the gravity constant at the new location has increased or decreased.

An essential feature of the invention consists in the provision of a structure limiting the motions of the mass to magnitudes which are small as compared to those which would normally result from the varying gravitational force and from the elastic force of the spring 12 acting together upon the mass. It is, therefore, apparent that the stress of the spring 12 is maintained substantially uniform in spite of the variation in the gravitational force and consequently, the elastic imperfections which usually accompany the stress variations are eliminated.

The procedure to be adopted in order to determine the gravity difference between a locality A and a locality B is as follows: The apparatus is assumed to be originally at the locality A at which the mass 10 is adjusted by means of springs 16, 17, 18 to its mean position, so as to prevent any contact with either of the stops. Then the galvanometers 22, 27, 32 indicate no current. Assume now that the apparatus has been moved to the locality B and that under the present conditions the galvanometers 27, 32 still indicate no current, while the galvanometer 22 indicates either (1) no current or (2) a current flowing towards the mass 10 or (3) a current flowing away from the mass 10.

In the first case when the galvanometer 22 indicates no current, there is no direct electrical connection between the mass 10 and either of the stops 13a, 13b. Consequently, the position of the mass 10 at the station B is the same as at the station A and, therefore, there is no difference in gravity between the station A and the station B.

In the second case when the galvanometer 22 indicates a current flowing towards the mass 10, the circuit across the output terminals of the battery 23 is closed while the circuit across the output terminals of the battery 25 is open. Consequently, there exists an electrical connection between the mass 10 and the stop 13a, and therefore, at the station B the mass 10 has been displaced upwards with reference to its neutral position which is had at the station A. It is, therefore, apparent that the indication of the galvanometer should be interpreted as corresponding to a decrease of gravity at the station B as compared to the station A.

In the third case when the galvanometer indicates a current flowing away from the mass 10, the circuit across the output terminals of the battery 25 is closed while the circuit across the output terminals of the battery 23 is open. Consequently, the mass 10 has been displaced downwards with respect to its neutral position and the indication of the galvanometer should be interpreted as corresponding to an increase of gravity at the station B as compared to the station A.

It is therefore, apparent that when the apparatus has been moved from one locality to another the indication of the galvanometer 22 shows the corresponding gravity variations. The deflection of the galvanometer in a determined direction corresponds to an increase in the gravity constant while the deflection in the opposite direction corresponds to a decrease in the gravity constant. After the deflection of the galvanometer has been ascertained, the adjustable spring 16 is made to restore the mass to the position at which the galvanometer deflection is zero, and the indication of the tension of the adjustable spring gives the value of the gravity change.

For the satisfactory operation of the apparatus it is necessary that the electrical contact between the upper surface of the mass 10 and the surface of the stop 13a be uniform and consequently, these two surfaces should be maintained parallel one to another. Similarly, the lower surface of the mass 10 and the surface of the stop 13b should be maintained parallel one to another. This is effected by maintaining the position of the mass so as to be symmetrical with respect to the vertical plane passing through the line $L_1$ and with respect to the vertical plane passing through the line $L_2$. The Lines $L_1$ and $L_2$ are shown on Fig. 2, the first of the said lines connecting the centers of the stops 15a, 15b and the second of the said lines connecting the centers of the stops 14a, 14b.

It is apparent that if the position of the mass 10 ceases to be symmetrical with respect to the horizontal plane passing through the line $L_1$ and the mass approaches for instance, the stop 14a, an electrical connection becomes established between the mass and the stop 14a and a current is delivered by the battery 28 through the galvanometer 27, the mass 10, stop 14a, and resistor 29. This current causes a deflection of the galvanometer 27 and consequently, informs the observer that the mass has been displaced from its position of symmetry. In order, therefore, to restore the mass to its position of symmetry with respect to the vertical plane passing through the line $L_1$, the observer must adjust the tension of the spring 17 by means of the screw 20 until the deflection of the galvanometer becomes zero again.

If the mass 10 has been displaced from its position of symmetry towards the stop 14b, a current is delivered by the battery 30 through the resistor 31, stop 14b, mass 10 and the galvanometer 27. This current causes the galvanometer to produce a deflection in a direction opposite to the one occurring under the conditions described in the preceding paragraph. Then the observer restores the mass to its position of symmetry by controlling the tension of the adjustable spring 17 in a direction opposite to the one previously referred to, until the galvanometer 27 indicates one current.

In a similar manner, when the mass becomes displaced towards the stop 15a or 15b, the galvanometer 32 shows a deflection depending upon the displacement of the mass and the mass is restored to its position of symmetry by acting upon the spring 18 until the galvanometer indicates no current.

It is now apparent that I have provided a gravity measuring apparatus in which the suspended mass 10 is maintained stationary and the gravity differences are counterbalanced by an adjustable spring 16.

It will be understood that the device illustrated in Fig. 1 and Fig. 2 is mounted in a suitable frame and casing and that the parts may be arranged in other manners than that shown. I have here represented them in such positions as to make the drawing most clear, rather than in such positions as they would best be placed in actual construction.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

I claim:

1. In an apparatus for effecting measurements of gravity variations, a movable mass, a spring supporting the mass, the said spring possessing elastic imperfections which accompany the displacement of the mass from its mean position, stops for limiting the maximum displacement of the mass, means for producing an electrical signal when the said maximum displacement is attained, an adjustable spring for returning the mass to its mean position when the said electrical signal has been produced, and a means for indicating the conditions of the said adjustable spring as a measure of the said gravity variations.

2. In an apparatus for effecting measurements of gravity variations, a movable mass, a spring supporting the mass, the said spring possessing elastic imperfections which accompany the displacement of the mass from its mean position in the upward or in the downward direction, stops for limiting the maximum displacement of the mass in the upward or in the downward direction, means for producing an electrical signal when the said maximum displacement has been attained in the upward direction and another electrical signal when the said maximum displacement has been attained in the downward direction, an additional spring connected to the said mass, means for decreasing the tension of the said additional spring upon the reception of the said first signal and for increasing the tension of the said additional spring upon the reception of the said other signal, the said decreasing or increasing of the tension being effective to return the mass to its mean position, and a means for indicating the condition of the said additional spring as a measure of the gravity variation.

3. In an apparatus for effecting measurements of gravity variations, a movable mass of an electrically conductive material, a spring supporting the mass, the said spring possessing elastic imperfections which accompany the displacement of the mass from its mean position in the upward or in the downward direction, stops for limiting the maximum displacement of the mass in the upward or in the downward direction, the said stops including two contact elements, one of the said contact elements providing a direct electrical connection with the mass when the maximum displacement has been attained in the upward direction, the other of the said contact elements establishing a direct electrical connection with the mass when the maximum displacement has been attained in the downward direction, an electrical circuit connected to the mass and to the contact elements, the said electrical circuit comprising a source of current and a galvanometer, the said galvanometer indicating a current in one direction upon the establishment of the first of the said electrical connections and a current in another direction upon the establishment of the second of the said electrical connections, an additional spring attached to the mass, means for decreasing the tension of the said additional spring upon the reception of the first said current and for increasing the tension of the said additional spring upon the reception of the second said current, the said decreasing or increasing of the tension being effective to return the mass to its mean position, and a means for indicating the condition of the said additional spring as a measure of the gravity variation.

4. In an apparatus for effecting measurements of gravity, a fixed support, a mass, an elastic member between the said mass and the said support, means for limiting the movement of the mass under the effect of a varying gravitational force, the said limiting means including stops, an element indicating the establishment of a contact between the said mass and the said stops under the effect of a change in the gravitational force, an auxiliary elastic member between the said mass and the said support, means for adjusting the tension of the said auxiliary elastic member to remove the said contact, and means for indicating the condition of the said auxiliary elastic member.

5. In an apparatus for effecting measurements of gravity, a fixed support, a mass, an elastic member between the said mass and the said support, means for limiting the movement of the mass under the effect of a varying gravitational force, the said limiting means including at least two stops, means comprising an electrical circuit and a source of voltage for causing the said source of voltage to produce a current in the said circuit upon the establishment of a contact between the said mass and any of the said stops under the effect of a change in the gravitational force, an auxiliary elastic member between the said mass and the said support, means for adjusting the tension of the said auxiliary elastic member to remove the said contact, and means for indicating the condition of the said auxiliary elastic member.

SERGE ALEXANDER SCHERBATSKOY.